United States Patent

Grace et al.

[11] Patent Number: 5,315,614
[45] Date of Patent: May 24, 1994

[54] APPARATUS AND METHOD FOR SOFT FOCUSING ENERGY INTO AN OPTICAL FIBER ARRAY

[75] Inventors: Kenneth P. Grace, Woodland Park; Michael B. Donnelly; Dean J. Geraci, both of Colorado Springs, all of Colo.

[73] Assignee: The Spectranetics Corporation, Colorado Springs, Colo.

[21] Appl. No.: 55,348

[22] Filed: May 3, 1993

[51] Int. Cl.⁵ .................................................. H01S 3/08
[52] U.S. Cl. ..................................... 372/101; 372/92; 372/6; 372/57; 385/49; 385/39
[58] Field of Search ............... 372/101, 92, 107, 6, 372/57; 385/49, 39, 28

[56] References Cited

U.S. PATENT DOCUMENTS

| | | | |
|---|---|---|---|
| 4,151,487 | 4/1979 | Chi | 372/92 |
| 4,426,707 | 1/1984 | Martin | 372/95 |
| 4,554,666 | 11/1985 | Altman | 372/19 |
| 4,723,247 | 2/1988 | Bhowmik | 372/2 |
| 4,732,448 | 3/1988 | Goldenberg | 350/96.18 |
| 4,745,618 | 5/1988 | Burger | 372/101 |
| 4,784,486 | 11/1988 | Van Wagnen et al. | 356/301 |
| 4,884,281 | 11/1989 | Hawthorn | 372/75 |
| 4,942,586 | 7/1990 | Lai | 372/68 |
| 4,942,588 | 7/1990 | Yasui | 372/103 |
| 5,042,047 | 8/1991 | Ono | 372/86 |
| 5,063,569 | 11/1991 | Xie | 372/45 |
| 5,064,284 | 11/1991 | Johnston, Jr. | 356/121 |
| 5,069,527 | 12/1991 | Johnston, Jr. | 359/823 |
| 5,070,505 | 12/1991 | Dixon | 372/22 |
| 5,078,491 | 1/1992 | Johnston, Jr. | 356/121 |
| 5,079,445 | 1/1992 | Guyer | 359/330 |
| 5,084,884 | 1/1992 | Terada | 372/29 |
| 5,100,231 | 3/1992 | Sasnett | 356/121 |
| 5,101,415 | 3/1992 | Kolb | 372/99 |

OTHER PUBLICATIONS

Shafer, D., "Gaussian to Flat-Top Intensity Distributing Lens", Optics and Laser Technology, (Jun. 1982), p. 159.
Bruno, Roy J., et al., "Laserbeam Shaping for Maximum Uniformity and Minimum Loss", Lasers and Applications (Apr. 1987), pp. 91-94.

Primary Examiner—Georgia Y. Epps
Attorney, Agent, or Firm—Cushman, Darby & Cushman

[57] ABSTRACT

A method and apparatus for coupling laser energy into an optical fiber employs a laser with a concave reflector and a planar reflector, a plano-convex focusing lens and an optical fiber array. A divergent laser beam is emitted from the laser and is focused to a beam waist by the plano-convex lens. Within the beam waist exists a soft focal plane wherein the laser energy is relatively homogeneous across the beam's cross section. An optical fiber array is placed within the beam waist such that the soft focal plane substantially matches the size and shape of the proximal end of the optical fiber array. Thus, laser energy is coupled to the optical fiber array at the soft focal plane within the beam waist at a fluence level below the fluence damage threshold of the optical fiber array and in a relatively homogeneous fashion across the cross section of the optical fiber array.

41 Claims, 2 Drawing Sheets

APPARATUS AND METHOD FOR SOFT FOCUSING ENERGY INTO AN OPTICAL FIBER ARRAY

BACKGROUND OF THE INVENTION

1. Field of the Invention

This invention relates to the coupling of laser energy into a proximal end of an optical fiber array including one or more Optical fibers. More Particularly, this invention relates to launching a soft-focused laser beam into the fiber array at the beam waist.

2. Description of the Related Art

Traditionally, laser energy is coupled into an optical fiber array by passing energy from a laser through one or more lenses. The laser creates a collimated beam of light and the lenses focus the beam to a sharp spot or point. The optical fiber array is placed within the beam a short distance in front of or behind the focal point such that the cross sectional area of the beam substantially matches the cross sectional area of the ends of the fibers.

The amount of energy that can be coupled from a particular laser beam into a particular optical fiber of an array is dependent on the fluence-damage-threshold of the fiber. For optimal coupling, the fluence of the laser beam must be less than the fluence-damage-threshold of the optical fiber. If the fluence of the laser beam is higher than the fluence-damage-threshold of the fiber, the fiber will be burned or destroyed.

In an ideal situation a laser beam distributes a uniform fluence across the incident end of the optical fiber array. Actual laser beams, however, do not distribute a uniform fluence across a cross section of the beam. This results in burnt or destroyed spots at the input end of the fiber array.

Focusing of a laser beam can, for example, be accomplished by a plano-convex lens. The plano-convex lens converges a collimated beam that passes through it into an infinitesimally small spot or focal point. The focal point contains substantially all the energy projected by the laser and can potentially damage the end of the optical fiber should the fiber end be positioned at the focal point. Because of this potential damage, the end of the optical fiber array is generally restricted from placement at the focal point in high energy coupling systems.

U.S. Pat. No. (USP) 4,732,448 to Goldenberg teaches the technique of focusing a laser beam in front of a fiber optic array. Even when the end of the fiber array is positioned away from the focal point of a focused laser beam, laser energy may be unevenly distributed across the input area of the optical fiber. In other words, the result can be nonuniform transmission of laser energy through different cross sectional parts of the optical fiber array.

Furthermore, laser beams, such as those from transverse electric discharge lasers like excimer lasers, are rectangular in cross sectional shape and not conducive to being coupled to a traditionally circular or hexagonal fiber array configuration. Coupling of the rectangular laser beam into the non-rectangular array will result in energy loss due to overspill of the beam beyond the optical fiber array.

Various apparatus and methods have been attempted to solve the above efficiency draining problems related to the coupling of laser energy into an optical fiber array's proximal end, the mismatching of the beam fluence levels to the fluence-damage-threshold of the fiber, the uneven distribution of laser energy over a cross section of a fiber, and the difficulty of matching a rectangular shaped laser beam to a circular or hexagonal optical fiber array configuration.

An apparatus for homogenization of laser beam fluence levels at the incident end of an optical fiber can permit laser energy-coupling with less damage to an optical fiber. Such an apparatus and method can increase the amount of laser energy coupled to an optical fiber without the optical fiber being subjected to fluence levels greater than the damage threshold of the fiber.

The problem of uneven laser energy distribution across the cross section of an optical fiber array end has been remedied in various ways. These remedies include beam homogenizers, aspheric lenses, afocal doublets, apparatus for focusing a laser into a focal line in order to couple the line into fibers arranged in a linear configuration, and an apparatus using a meniscus lens containing a spherical aberration.

A beam homogenizer folds the side lobes of an incident laser beam back into the central portion of the beam creating a homogeneous beam of uniform intensity across its energy profile. U.S. Pat. No. 4,793,694 to Liu teaches a method of homogenizing a laser beam using symmetrical mirror pairs located along the axis of the laser beam. The first set of mirrors separates the side lobes of the beam from the center of the beam and the second set of mirrors folds the beam imaging each side lobe to the opposite side of the central axis from where it originated. The resultant-superimposed beam is more uniformly distributed across its cross section than the original beam. The patent teaches that a trapezoidal prism may also be employed. See also, Roy J. Bruno et al., "Laser Beam Shaping for Maximum Uniformity and Minimum Loss", *Lasers & Applications*, April 1987, pp. 91–94.

Aspheric lenses are also used to homogenize a beam cross section or profile and are described in D. Shafer, *Gaussian to Flat-Top Intensity Distributing Lens*, Optics and Laser Technology, June 1982, pg. 159. An aspheric plate, usually having a conic surface of revolution about the lens axis, modifies an incoming laser beam so that the intensity of the beam becomes uniform across the beam profile. A second plate modifies the light waves eliminating spherical aberration without modifying the uniformly distributed energy profile. The result is an unaberrated substantially uniform distribution of laser energy across the profile of the beam.

Afocal doublets, another known method of homogenizing the energy distribution of a laser beam, comprise closely spaced positive and negative lens focusing elements. D. Shafer, *Gaussian to Flat-Top Intensity Distributing Lens*, Optics and Laser Technology, June 1982, pg. 159. In a typical arrangement, the lenses are bent to introduce large amounts of spherical aberration. A laser beam is passed through the first element. Paraxial rays remain essentially unaffected, but other rays will encounter a great amount of uncorrected spherical aberration. The paraxial rays remain collimated in space between the first and second elements, but the rays that encountered the spherical aberration converge between the lens elements. When the rays reach the second lens, the converging rays are contained in a smaller area increasing the fluence of the periphery of the beam. Meanwhile, the energy of the centrally located collimated rays remains unchanged. The second element of the doublet has an equal and opposite spherical aberration with respect to the first element. The second element recollimates the energy beam such that the result is a collimated substantially uniform energy distribution across the beam profile.

An apparatus to focus a laser beam into a focal line then couple the line into fibers arranged in a linear array is taught in U.S. Pat. No. 5,016,964 to Donnelly. The focusing of the laser into a finite line homogenizes the beam such that fluence 37 spikes" do not damage the individual fibers arranged linearly.

Finally, U.S. Pat. No. 4,998,794 to Holzman teaches another technique of homogenizing the fluence of a laser beam at the incident end of an optical fiber array which includes the use of a meniscus lens. A spherical aberration located in the central area of the lens blurs the focal point and reduces the peak fluence levels at the incident end of the optical fiber array. The focal point formed by the meniscus lens consists of laser energy originating from the outer portions of the beam profile folded into the inner portion of the profile. This creates a uniform distribution of energy within the focal spot. It should be noted that the power coupling efficiency is reduced due to the aberration at the center of the meniscus lens.

All the above methods for alleviating the problem of uneven energy distribution across a beam profile requires the laser beam energy to be focused either to a focal point, line, or a blurred focal point. With the focal point or focal line, the beam is focused either just in front of or just behind the proximal end of the fibers. A maximum homogeneous energy fluence transfer from beam to fiber is difficult to acquire in this configuration because of the geometry of the light rays. Furthermore, if the beam is focused to a blurred focal point, the power coupling efficiency is reduced. In conclusion, it should be noted that maximum laser fluence energy coupling is difficult to achieve due to alignment and maintenance requirements of all the above mentioned laser, lens, and optical fiber end configurations.

In all the techniques, except the apparatus that focuses laser energy into a line, there is the additional problem of manipulating the naturally rectangular shaped laser beam into a circular or hexagonal shaped beam to accommodate a circular or hexagonal optical fiber array. One method used for adjusting the shape of the laser beam is to pass the beam through a spatial filter prior to its impingement upon the optical fiber. The spatial filter rounds or shapes the beam by blocking the peripheral portions of the rectangular beam. Unfortunately, this technique results in significant beam energy loss prior to coupling with the optical fiber end. Thus, a coupling system is desired wherein the shape of the fiber optic cable closely matches the rectangular shape of the laser beam.

A known method for intentionally limiting the energy of a laser beam prior to impingement upon an optical fiber array includes the use of an intensity adjusting device. An intensity adjusting device blocks predetermined portions of the laser beam in order to decrease its total energy. If an intensity adjustment device is used to limit laser energy in any of the above described methods and apparatus, a silhouette of the device may be focused onto the proximal end of the optical fiber array resulting in further nonuniform fluence across the proximal surface of the fiber end. Thus, there is a need for a method and apparatus which can vary a laser beam's total energy prior to the beam's impingement on the proximal end of an optical fiber array by using an intensity adjustment device, and still have a homogeneous laser energy fluence across the cross section of the optical fiber array's end.

U.S. Pat. No. 5,069,527 to Johnson, Jr. and 5,100,231 to Sasnett et al. both teach an apparatus that uses a laser beam waist, but make no mention of using the beam waist to focus laser energy homogeneously into a fiber optic array. Instead, Johnson Jr. and Sasnett teach how to find a laser beam waist and measure its mode quality.

The following patents are related to the use of a laser apparatus having a concave reflector: U.S. Pat. No. 4,942,588; 4,723,247; 5,101,415; 4,884,281; 4,554,666 and 4,151,487. Furthermore, the following U.S. patents discuss laser cavity design and laser beam optical configurations: 5,084,884; 5,079,445; 5,078,491; 5,070,505; 5,064,284; 5,063,569; 5,042,047; 4,942,586, and 4,426,707.

SUMMARY OF THE INVENTION

The present invention provides an efficient apparatus and method for coupling laser beam energy into an optical fiber array. The present invention uses a laser having a concave reflector at one end and a planar reflector at the other end of a laser cavity. This configuration produces a divergent laser beam. An excimer laser or other similar high power laser may be used. The divergent beam is focused via a plano-convex lens to a beam waist. At a cross section of the beam waist exists a soft focal plane at which the laser beam energy distribution closely matches the distribution which exists internal to the laser cavity. The soft focal plane is the same shape as the lasing area such that a rectangular lasing area will produce a rectangular soft focal plane. An end of an optical fiber array, having one or more optical fibers, is positioned at the soft focal plane such that the soft focal plane substantially matches the size and shape of the optical fiber array end. The optical fiber array receives the laser energy in an optimal manner.

The present invention is particularly suited for coupling laser energy into an optical fiber array used in laser angioplasty or other laser surgical devices. Several different fiber array dimensions can be used without a change in the coupling fluence.

It is an object of the present invention to decrease the complexity of manufacturing laser-to-optical fiber couplers.

It is a further object of the present invention to create a somewhat homogeneous soft focal plane such that an attenuation device, such as a beam blind, does not change the intensity profile of the laser beam at the soft focal point.

It is a further object of the present invention to create laser-energy-to-optical fiber coupling system in which the coupling occurs at the maximum fluence level allowable by the optical fiber array regardless of the cross sectional size or shape of the end of the optical fiber array.

BRIEF DESCRIPTION OF THE DRAWINGS

In accordance with these and other objects which will be apparent to those skilled in the art, the present invention will be described with particular reference to the accompanying drawings, in which.

DETAILED DESCRIPTION OF THE PRESENTLY PREFERRED EXEMPLARY EMBODIMENTS

Figure 1:
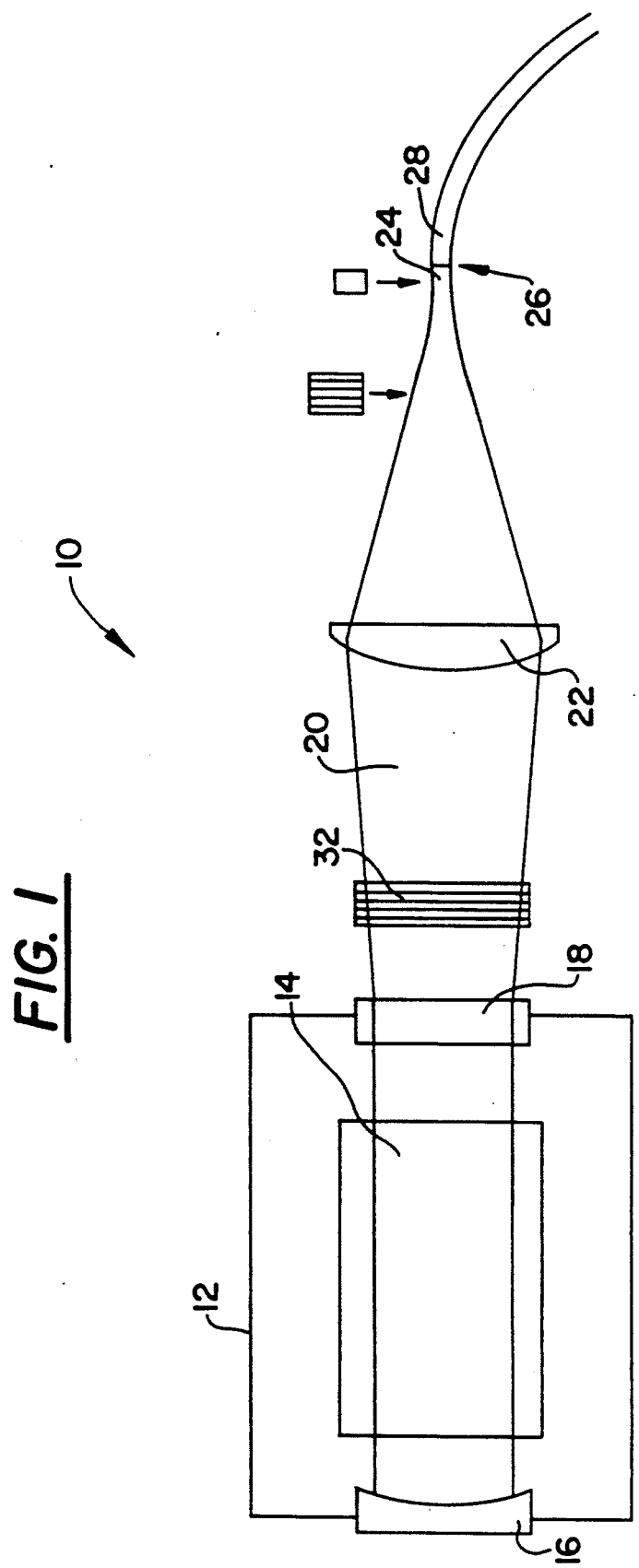
FIG. 1 illustrates a simplified cross sectional view of one embodiment of the present invention.

FIG. 1 illustrates a cross sectional diagram of a soft focusing laser apparatus 10 according to the present invention. A high power laser 12, preferably an excimer laser, includes a laser cavity 14 having a lasing area with a rectangular cross section. At one end of laser cavity 14 is a concave total reflector 16 and at the other end of laser cavity 14 is a planar partial reflector or optical coupler 18. In a preferred embodiment the concave total reflector 16 has a radius of curvature of approximately −7.50 meters. The concave total reflector 16 and planar output coupler 18 combine within the laser cavity 14 to produce a stable, somewhat homogeneous, divergent output laser beam 20.

A plano-convex lens 22 is placed in front of the divergent beam 20 to focus laser beam 20 to a beam waist 24. In the preferred embodiment, the plano-convex lens 22 can be either fixed in position or movable such that the cross sectional size of the beam waist 24 can be varied. It should be noted that lenses other than a plano-convex lens can be used. Such lenses or lens configurations include, but are not limited to, meniscus, aspheric, and convex-convex lenses. A cross section of the beam at beam waist 24 represents an image of a finite position within laser cavity 14. The narrowest cross section of the beam waist 24 is the preferred soft focal plane 26 of the present apparatus. It is understood that the soft focal plane 26 can be any cross section located at or around the beam waist 24.

The soft focal plane 26 has a relatively homogeneous intensity distribution without undue fluence spikes. The soft focal plane 26 is rectangular in shape and retains the aspect ratio of the original output beam. The focal length and position of the plano-convex focusing lens 22 determines the dimensions of the soft focal plane. The soft focal plane 26 is also an image of a finite cross sectional plane within the laser cavity.

If the aspect ratio of the output beam needs to be changed, a cylindrical lens as taught by U.S. Pat. No. 5,016,964 can be used. The cylindrical lens (not shown in FIG. 1) can be inserted between the planar partial reflector 18 and the plano-convex lens 22. If a beam blind 32 is used, the cylindrical lens should be placed between the beam blind 32 and the plano-convex lens 22. The cylindrical lens can also be placed in other locations along the path of laser beam 20.

Figure 2A:
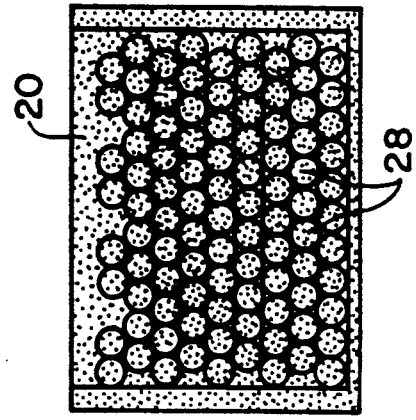
FIGS. 2a, 2b, and 2c, illustrate cross sectional views of optical fiber array ends that can be placed in the laser beam waist.
Figure 2B:
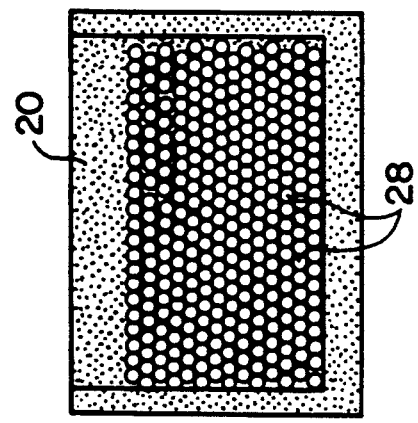
Figure 2C:
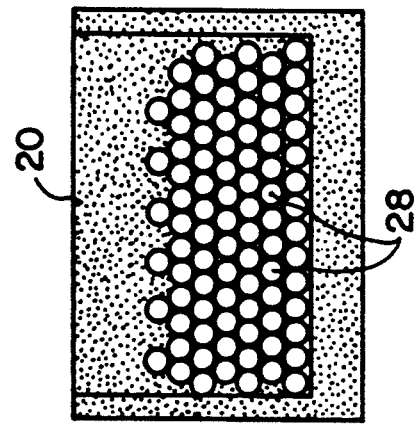

The preferred embodiment of the present invention further includes an optical fiber array 28 having preferably a substantially rectangular cross section at one end as shown in FIGS. 2a, 2b, and 2c. The optical fiber array 28 can be made of one or more optical fibers. If the optical fiber array 28 is made of multiple optical fibers, the individual fibers can be of different cross sectional sizes and shapes.

The optical fiber array 28 is positioned such that an end having the rectangular cross section is proximal to the beam waist 24. In particular, the proximal end is positioned within the beam waist such that the soft focal plane 26 is substantially focused onto the optical fiber array end. Preferably, the beam waist 24 is brought into focus such that the cross sectional dimensions of the beam waist 24 are equal to the largest cross sectional dimensions of the proximal end of the optical fiber array 28. A person skilled in the art can select the appropriate plano-convex focal lens 22 and position the lens such that the soft focal plane 26 is substantially the same size as the proximal end of the largest optical fiber array employed.

The cross sectional dimensioning of the beam waist 24 is accomplished by plano-convex lens selection and positioning. Since the soft focal plane 26 is of relatively homogeneous intensity, the intensity distribution across the proximal end of the optical fiber array 28 can be maximized to a fluence intensity just below the fluence damage threshold of the optical fibers in array 28.

Optical fiber arrays having dimensions smaller than the soft focal plane 26 all with the same fluence damage threshold can be used in the preferred apparatus 10 such that all the optical fiber arrays will be coupled to a maximum fluence level regardless of the drop in coupling efficiencies. Note that FIGS. 2a-2c illustrate that it is desirable to center the end of array 28 in the rectangular beam 20 even though the cross-sectional dimensions of array 28 may vary.

Another preferred embodiment of the present invention includes a proximal end the optical fiber array 28 that is substantially the same shape and size as the most homogeneous portion of the soft focal plane 26. Such an embodiment maximizes the amount of homogeneous laser energy coupled into the optical fiber array 28.

A preferred embodiment of the present invention can include an attenuator, such as a beam blind 32, located between the output coupler 18 of the laser 12 and the plano-convex lens 22. The beam blind 32 is used to adjust the total energy of the laser beam 20 prior to the beam's coupling with the optical fiber array 28. It is noted that the attenuator can be located in other locations along laser beam 20.

The present invention maintains a relatively homogeneous soft focal plane 26 at the beam waist 24 even when a beam blind 32 is used. If a laser that produces a collimated laser beam, instead of the present invention's divergent laser beam, is used, a beam blind placed between the laser and the plano-convex focusing lens will create a nonuniform laser beam and focal plane which is not advantageous for obtaining a uniform fluence at the laser beam optical fiber array coupling point.

The present invention 10 is extremely useful for any application wherein laser energy is to be carried by an optical fiber array based delivery system. The present invention is well suited for surgical applications using optical fiber delivery of laser energy. Such surgical applications include, but are not limited to laser angioplasty, and in particular, laser coronary angioplasty.

The present invention can also be used with a low power laser for the production of a relatively homogeneous laser beam for use in digital fiber optic communication or other applications wherein laser energy is focused into an optical cable.

It is further understood that the shape of the laser cavity 14, beam waist 24 and, optical fiber array 28 is not limited to a rectangular shape. The shape could be circular, octagonal or virtually any polygonal shape.

While the applicant has described the invention in what the applicant considers the most practical, preferred embodiments, the applicant does not limit the invention to the disclosed embodiment but, on the contrary, intends the invention to cover various modifications and equivalent arrangements included within the spirit and scope of the appended claims.

What is claimed is:

1. A soft focusing laser apparatus comprising:
   a laser cavity;
   a concave reflector positioned at a first end of the laser cavity;
   a planar reflector positioned at a second end of the laser cavity;
   a lens focusing a laser beam that emanates from the laser cavity to a beam waist; and
   an optical fiber array having a proximal end positioned substantially at the beam waist.

2. The laser apparatus of claim 1 wherein the concave reflector is a total reflector and the planar reflector is a partial reflector.

3. The laser apparatus of claim 1 wherein the lens is a plano-convex lens.

4. The laser apparatus of claim 1 wherein the lens is a meniscus lens.

5. The laser apparatus of claim 1 wherein the lens is an aspheric lens.

6. The laser apparatus of claim 1 wherein the lens is a convex-convex lens,

7. The laser apparatus of claim 1 wherein the lens is a combination of various lenses.

8. The laser apparatus of claim 1 wherein the laser cavity is for an excimer laser.

9. The laser apparatus of claim 1 wherein the lasing area of the laser cavity has a cross section that is rectangular.

10. The laser apparatus of claim 1 wherein the laser beam from the cavity is a divergent laser beam.

11. The laser apparatus of claim 1 wherein a relatively homogeneous and stable soft focal plane is located in the beam waist.

12. The laser apparatus of claim 1 wherein the beam waist has a cross section that is rectangular, said rectangular cross section having a predetermined aspect ratio.

13. The laser apparatus of claim 12 wherein the proximal end of the optical fiber array is rectangular.

14. The laser apparatus of claim 12 wherein a cylindrical lens is used to change the aspect ratio of said rectangular cross section.

15. The laser apparatus of claim 1 wherein the beam waist has a cross sectional size and shape that is substantially the same as the size and shape of the proximal end of the fiber optic array.

16. The laser apparatus of claim 15 wherein the beam waist and the proximal end of the fiber optic array are substantially in alignment.

17. The laser apparatus of claim 1 wherein the cross sectional shape of the laser cavity is substantially the same shape as the cross section of the proximal end of the optical fiber array.

18. The laser apparatus of claim 1 wherein the fiber optic array is comprised of a plurality of optical fibers.

19. The laser apparatus of claim 1 wherein the lens is moveable along the axis of the laser beam such that the cross sectional dimensions of the beam at the proximal end of the optical fiber array can be varied.

20. The laser apparatus of claim 1 wherein the location of the proximal end of the optical fiber array can be varied within the beam waist.

21. The laser apparatus of claim 1 wherein a soft focal plane is disposed at the narrowest location of the beam waist, the proximal end of the optical fiber array being positioned at the soft focal plane.

22. The laser apparatus of claim I wherein a soft focal plane is disposed within the beam waist, the proximal end of the optical fiber array being positioned at the soft focal plane.

23. The laser apparatus of claim 1 wherein the laser apparatus further comprises means for varying beam intensity located between the laser cavity and the lens so that the total energy intensity of the laser beam can be varied, said varying means not being imaged at said beam waist.

24. The laser apparatus of claim 23 wherein the means for varying is a beam blind.

25. An optical system comprising:
    laser means for generating a divergent laser beam;
    lens means for focusing the divergent beam to a beam waist, the lens means comprising at least one optical lens, the lens means creating a soft focal plane located within the beam waist; and
    an optical fiber array having an end illuminated by and substantially aligned with the beam waist, and positioned at the soft focal plane.

26. The optical system of claim 25 wherein the laser means is an excimer laser.

27. The optical system of claim 25 wherein the laser means comprises:
    a laser cavity;
    a concave total reflector positioned at a first end of the laser cavity; and
    a planar partial reflector positioned at a second end of the laser cavity.

28. The optical system of claim 25 wherein the lens means comprises a plano-convex lens.

29. The optical system of claim 25 wherein the lens means comprises a meniscus lens.

30. The optical system of claim 25 wherein the lens means comprises an aspheric lens.

31. The optical system of claim 25 wherein the lens means comprises an convex-convex lens.

32. The optical system of claim 25 wherein the lens means comprises a combination of optical lenses.

33. The optical system of claim 25 wherein the lens means can be positioned such that a cross section area of the beam waist can be enlarged or decreased at the proximal end of the fiber optical array.

34. The optical system of claim 25 wherein the optical fiber array comprises a plurality of optical fibers.

35. The optical system of claim 34 wherein the optical fibers are arranged such that the end of the optical fiber array is substantially rectangular.

36. The optical system of claim 25 wherein a cross section of the beam waist and a cross section of the end of the optical fiber array are substantially the same size and shape.

37. The optical system of claim 25 wherein a cross section of the end of the optical fiber array is substantially the same size and shape as a most homogeneous portion of the cross section of the beam waist.

38. A method for coupling a laser beam and an optical fiber array comprising the steps of:
    (a) creating a laser beam that is divergent;
    (b) passing the laser beam through a lens so that the laser beam is focused to a substantially homogeneous beam waist; and
    (c) positioning an optical fiber array to accept the laser beam at the beam waist.

39. The method for coupling a laser beam and an optical fiber array of claim 38 wherein the step (b) is accomplished by passing the laser beam through a plano-convex lens.

40. The method for coupling a laser beam and an optical fiber array of claim 38 further comprising the step of varying the laser intensity performed between step (b) and (c).

41. The method for coupling a laser beam and an optical fiber array of claim 40 wherein the step of varying includes blocking spatially separated portions of the laser beam whereby the fluence level of the laser beam transmitted into the fiber array can be adjusted.

* * * * *